(12) United States Patent
Kim

(10) Patent No.: US 11,565,416 B2
(45) Date of Patent: Jan. 31, 2023

(54) TRANSPORTING ROBOT AND METHOD FOR CONTROLLING THE SAME

(71) Applicant: LG ELECTRONICS INC., Seoul (KR)

(72) Inventor: Jungsik Kim, Gyeonggi-do (KR)

(73) Assignee: LG ELECTRONICS INC., Seoul (KR)

( * ) Notice: Subject to any disclaimer, the term of this patent is extended or adjusted under 35 U.S.C. 154(b) by 385 days.

(21) Appl. No.: 16/775,991

(22) Filed: Jan. 29, 2020

(65) Prior Publication Data

US 2021/0094178 A1  Apr. 1, 2021

(30) Foreign Application Priority Data

Sep. 27, 2019 (KR) .................. 10-2019-0119786

(51) Int. Cl.
| | | |
|---|---|---|
| B25J 9/16 | (2006.01) | |
| B25J 5/00 | (2006.01) | |
| B25J 11/00 | (2006.01) | |
| B25J 13/08 | (2006.01) | |
| G05D 1/02 | (2020.01) | |

(52) U.S. Cl.
CPC ............ B25J 9/1666 (2013.01); B25J 5/007 (2013.01); B25J 9/1633 (2013.01); B25J 9/1697 (2013.01); B25J 11/008 (2013.01); B25J 13/085 (2013.01); G05D 1/0214 (2013.01)

(58) Field of Classification Search
CPC ...... B25J 9/1666; B25J 9/1633; B25J 9/1697; B25J 9/1602; B25J 9/162; B25J 9/1651; B25J 9/1664; B25J 9/1676; B25J 5/007; B25J 11/008; B25J 13/085; B25J 19/0008; B25J 19/023; G05D 1/0214; G05D 1/027; G05D 1/0223; G05D 2201/0216

See application file for complete search history.

(56) References Cited

U.S. PATENT DOCUMENTS

| | | | | |
|---|---|---|---|---|
| 8,612,053 B2* | 12/2013 | Orita | ................ | B62D 57/032 700/251 |
| 9,327,397 B1* | 5/2016 | Williams | ................ | B65G 1/137 |
| 2011/0060460 A1* | 3/2011 | Oga | ................ | B25J 9/1633 700/254 |
| 2012/0173018 A1* | 7/2012 | Allen | ................ | G05D 1/0248 700/245 |
| 2018/0017461 A1* | 1/2018 | Arai | ................ | G01M 1/122 |
| 2020/0030992 A1* | 1/2020 | Motoyoshi | ............ | B25J 9/1676 |

FOREIGN PATENT DOCUMENTS

| | | | | |
|---|---|---|---|---|
| JP | 2006123854 A | * | 5/2006 | ............ B62K 3/007 |
| KR | 20180042975 A | * | 4/2018 | |
| KR | 10-2018-0123298 | | 11/2018 | |
| KR | 10-2019-0089794 | | 7/2019 | |
| WO | WO-2017153896 A1 | * | 9/2017 | |

* cited by examiner

*Primary Examiner* — Khoi H Tran
*Assistant Examiner* — Nhi Q Bui
(74) *Attorney, Agent, or Firm* — KED & Associates, LLP

(57) ABSTRACT

Disclosed is a transporting robot which executes a mounted artificial intelligence (AI) algorithm and/or machine learning algorithm and communicates with different electronic devices and external servers in a 5G communication environment. The transporting robot includes a wheel driver, a loading box, and a robot controller. The transporting robot is provided such that a transporting service using an autonomous robot may be provided.

16 Claims, 12 Drawing Sheets

[FIG. 1]
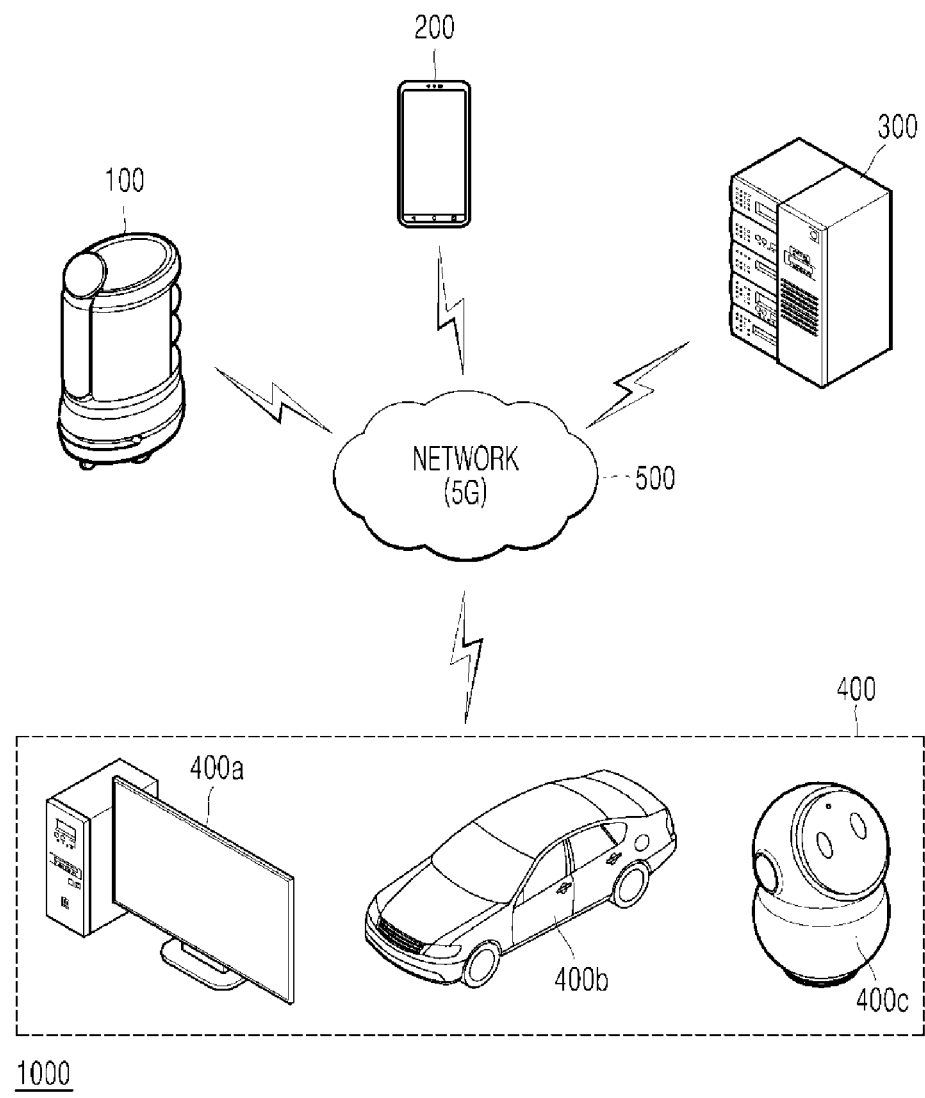

[FIG. 2]
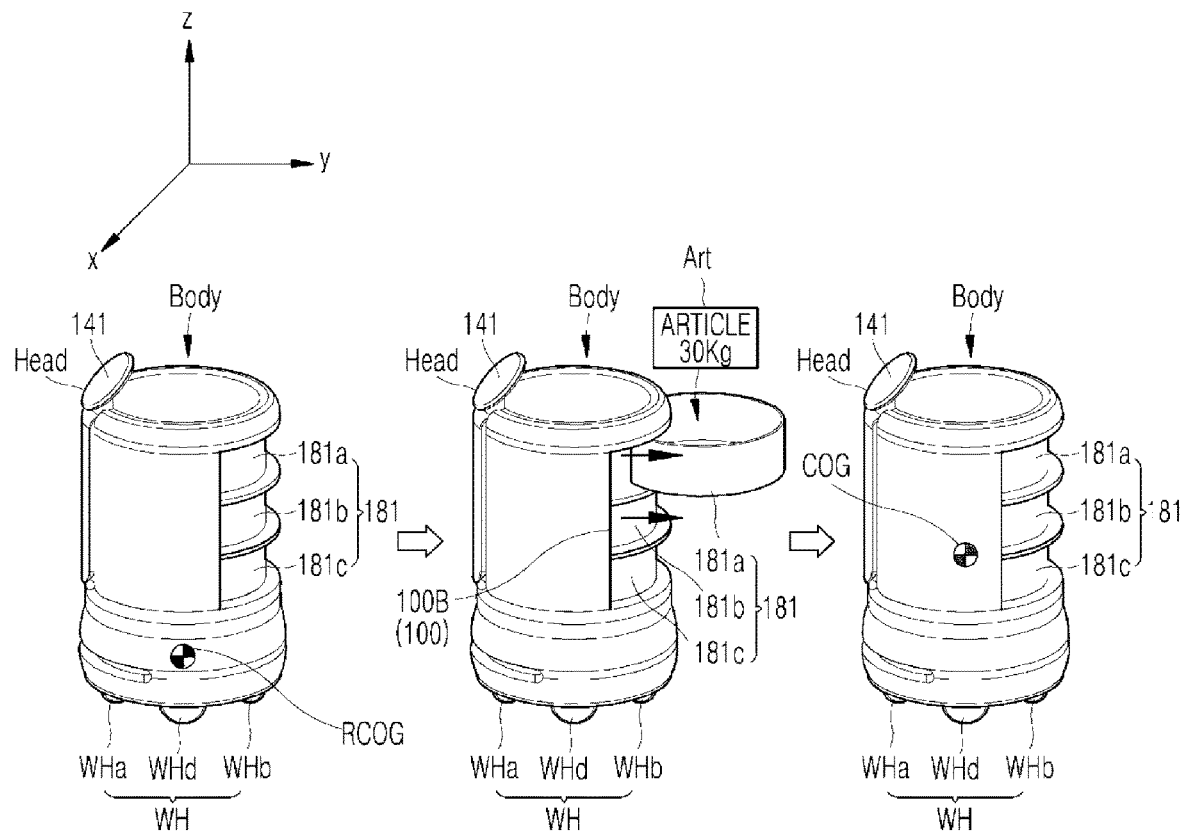

[FIG. 3]
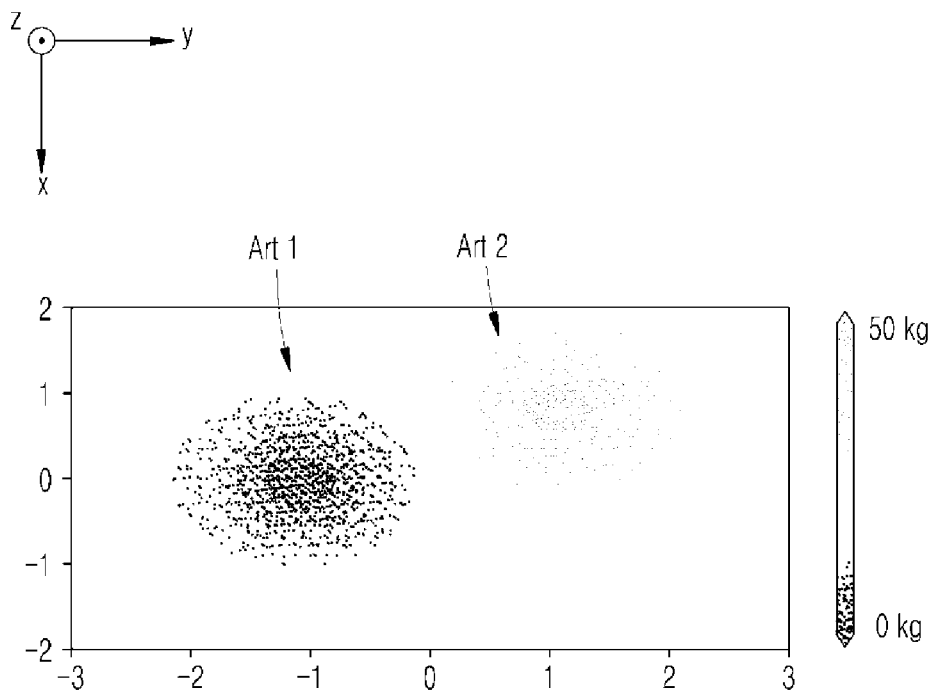
[FIG. 4]
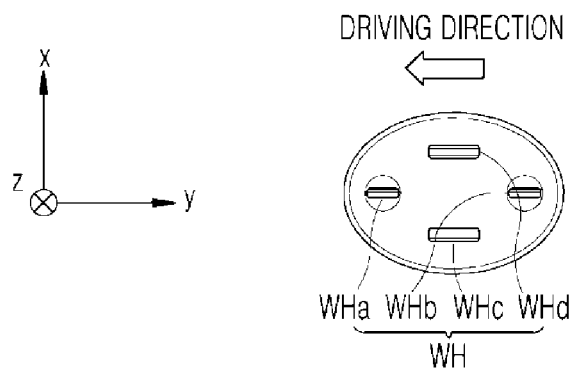

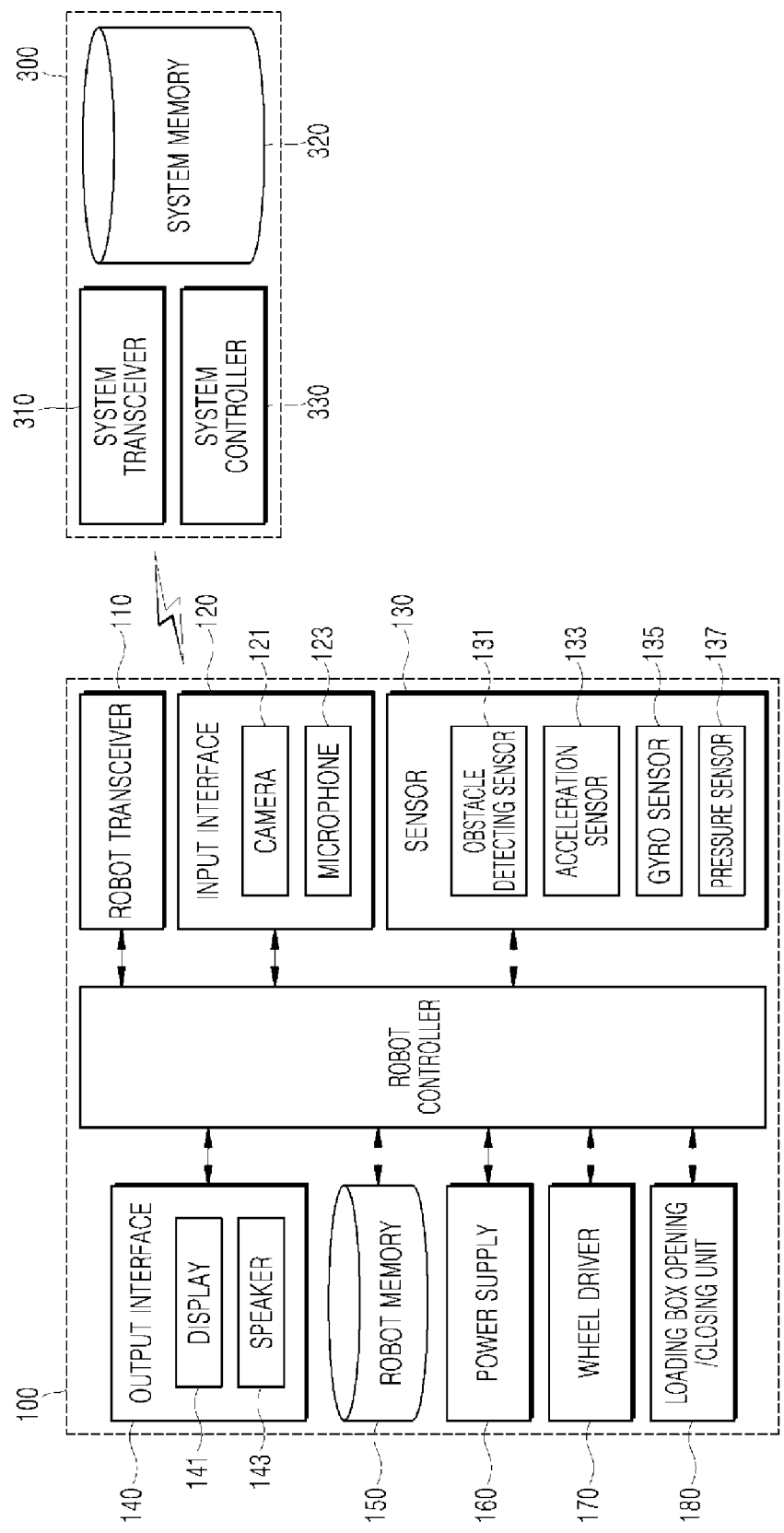

[FIG. 6A]
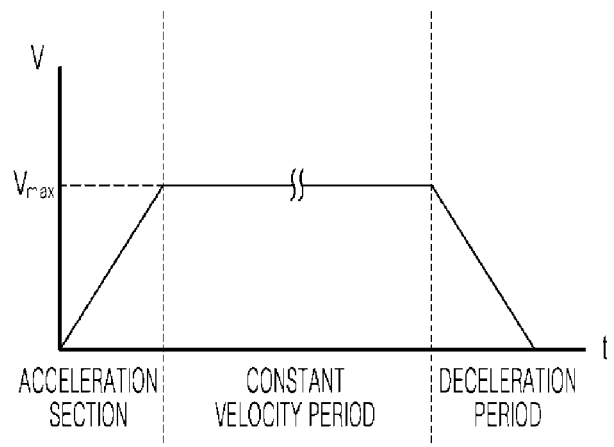
[FIG. 6B]
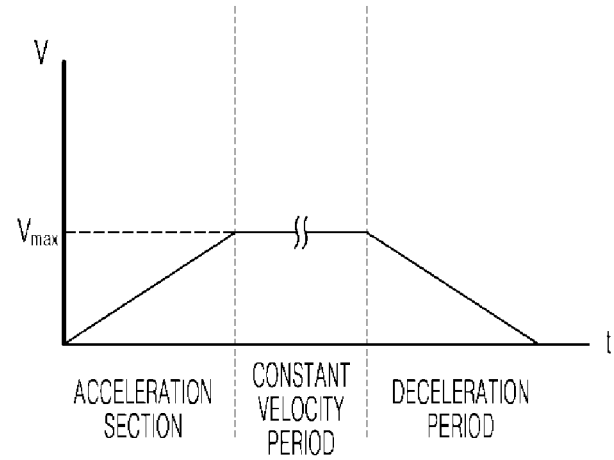

[FIG. 7]
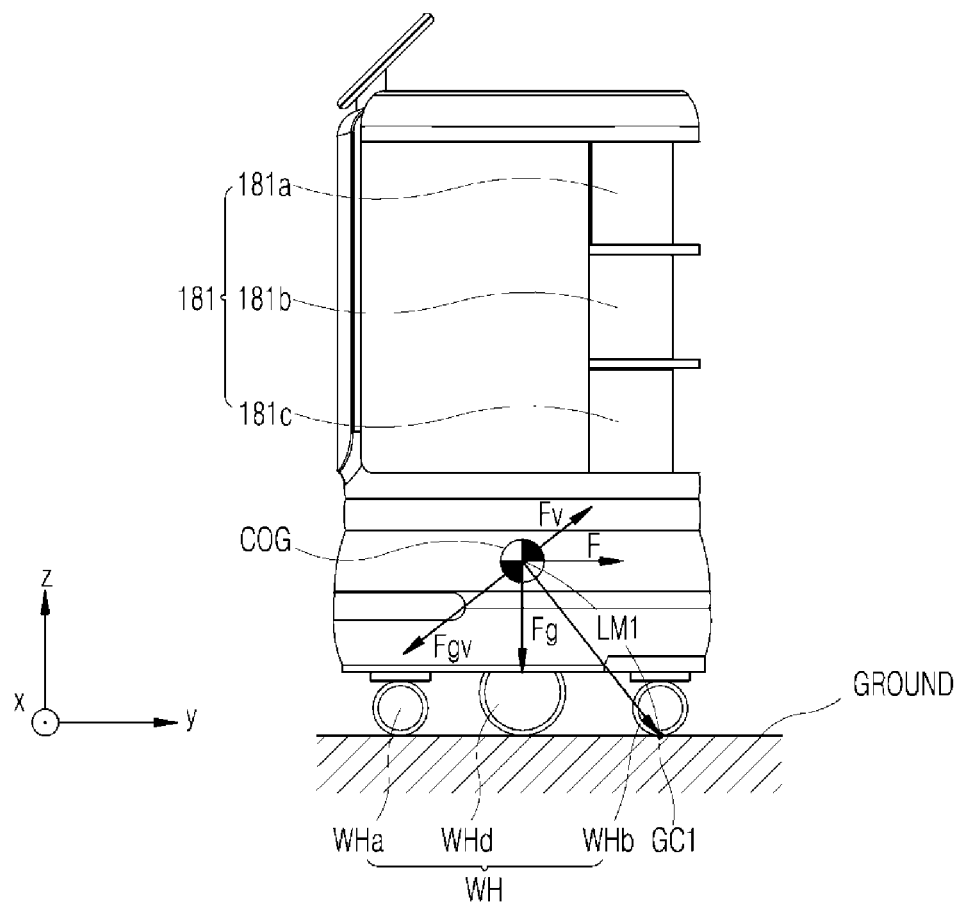

[FIG. 8]
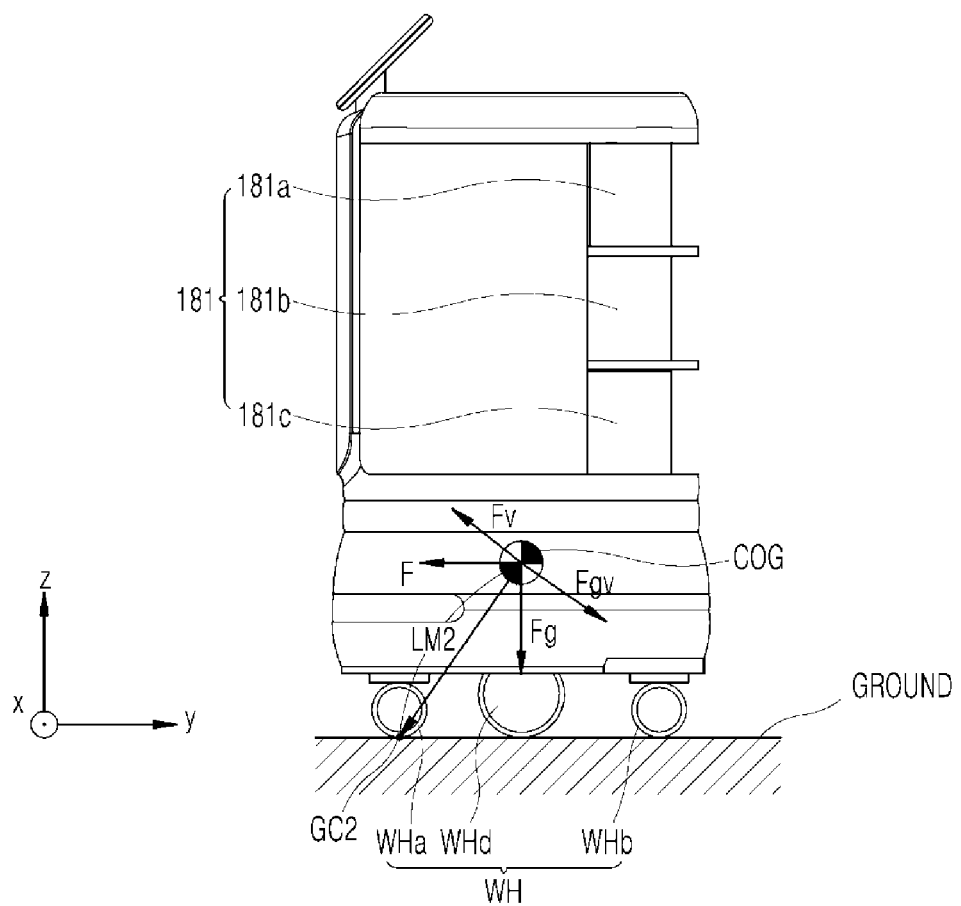

[FIG. 9]
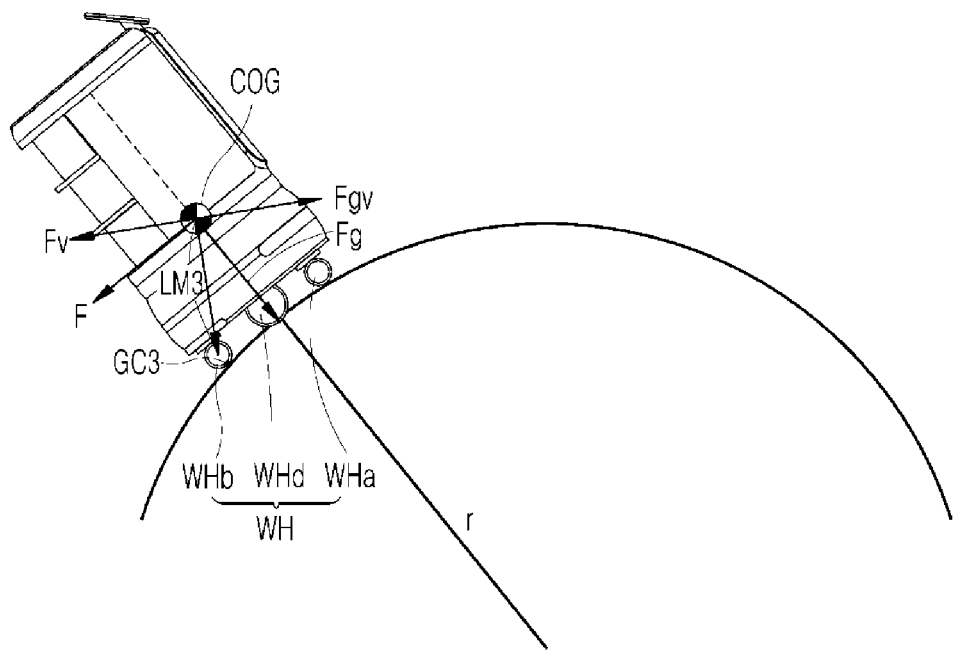
[FIG. 10]
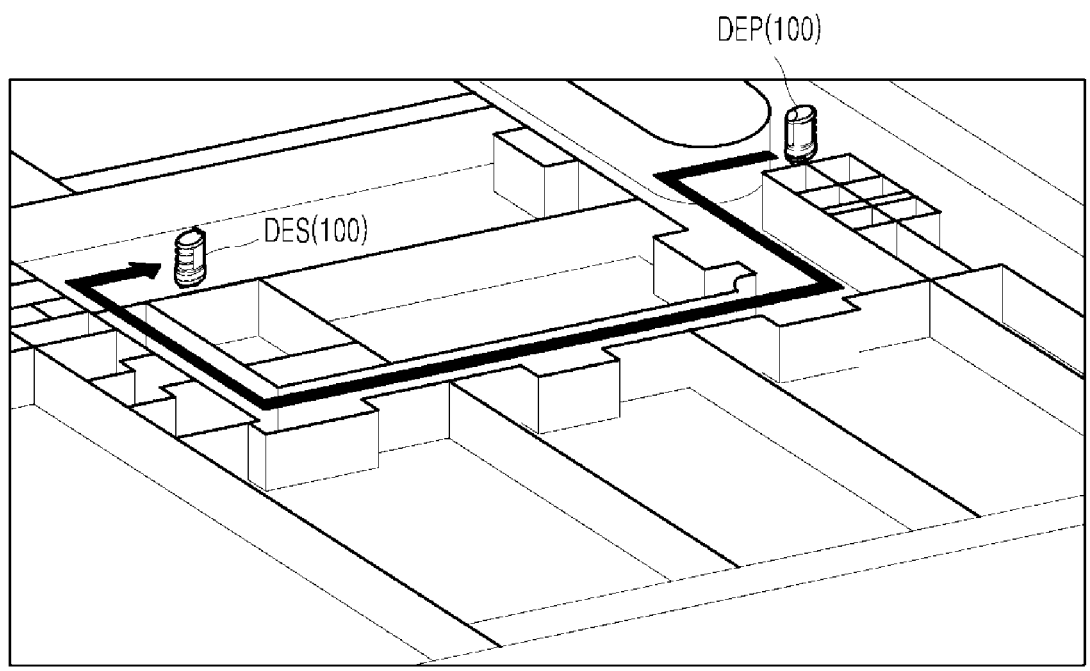

[FIG. 11A]
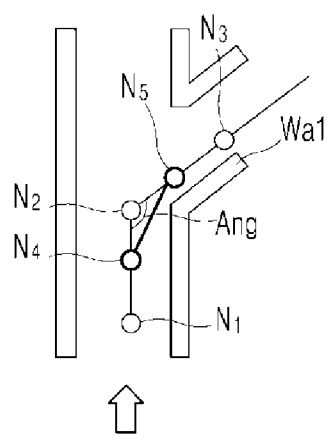
[FIG. 11B]
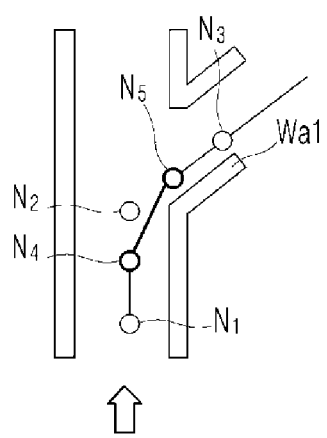

[FIG. 12]
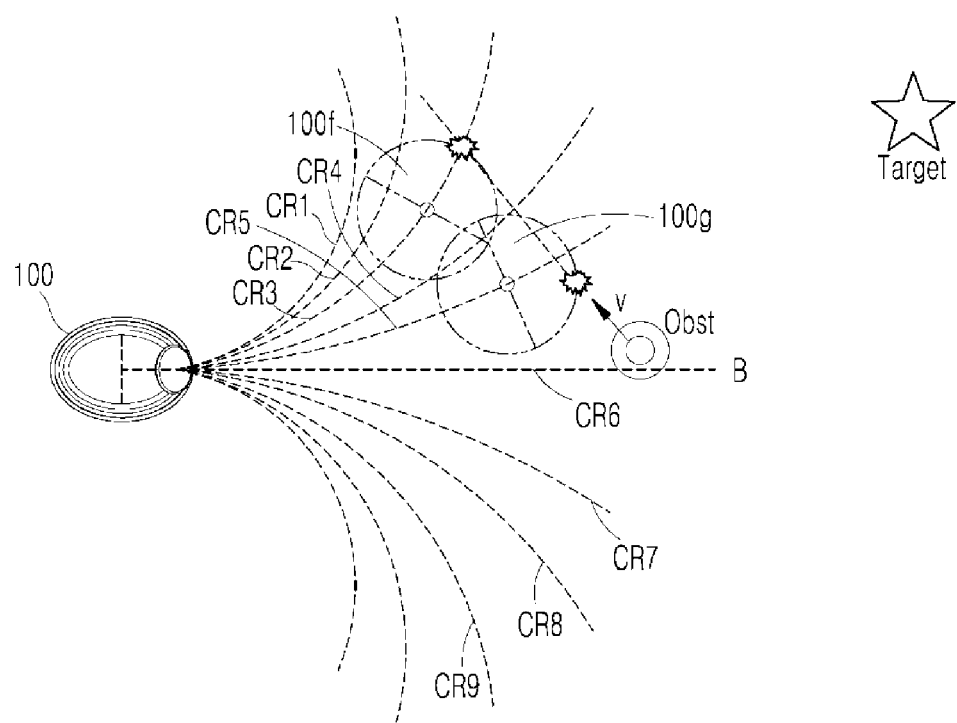

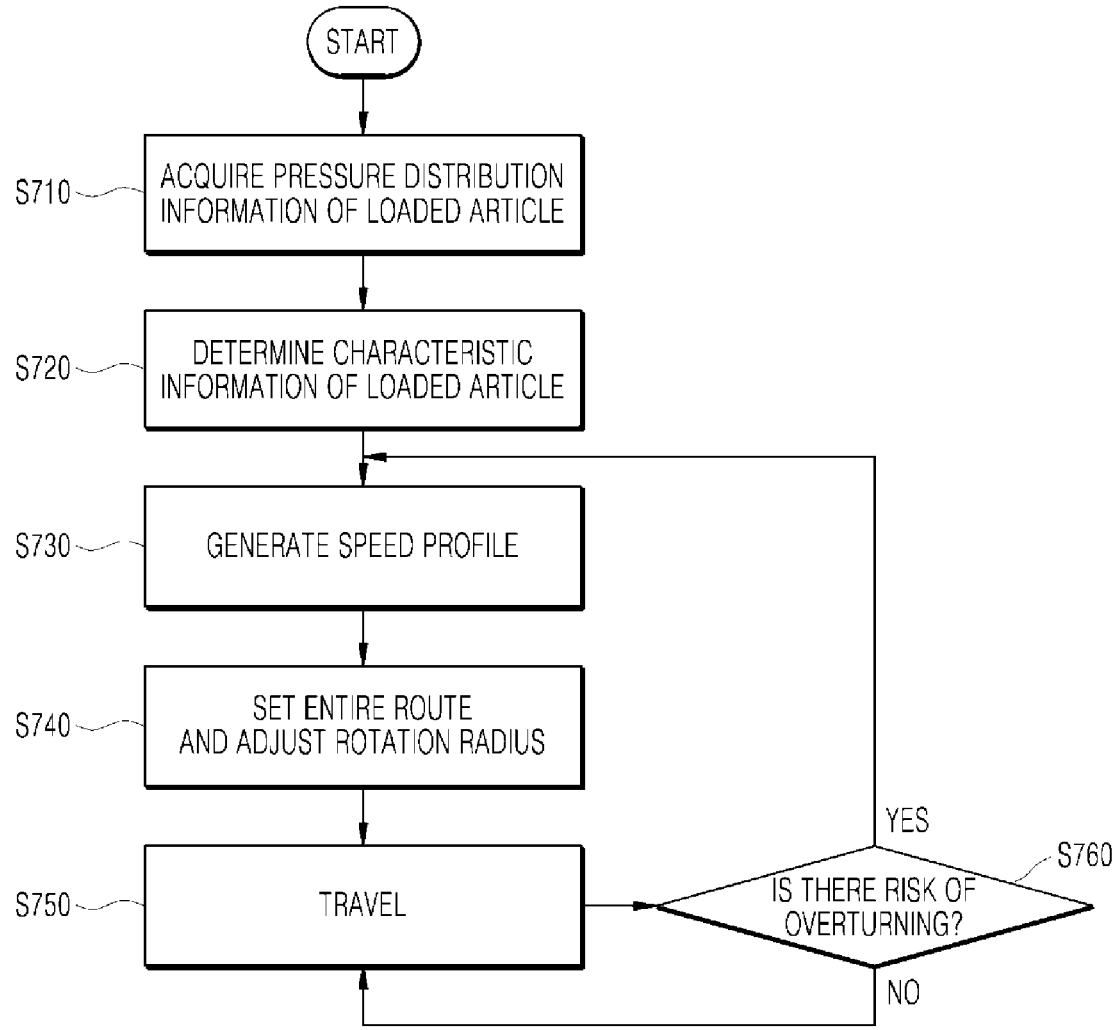
[FIG. 13]

[FIG. 14]
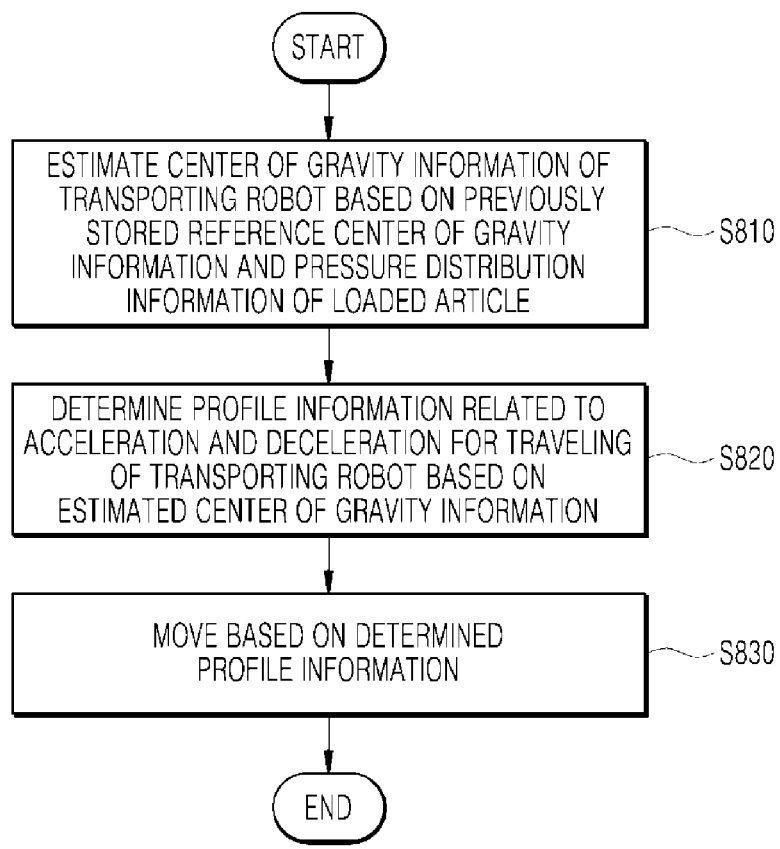

TRANSPORTING ROBOT AND METHOD FOR CONTROLLING THE SAME

CROSS-REFERENCE TO RELATED APPLICATION

The present application claims benefit of priority to Korean Patent Application No. 10-2019-0119786, entitled "Transporting robot and method for controlling the same," filed on Sep. 27, 2019 in the Korean Intellectual Property Office, the entirety of which is incorporated by reference herein.

BACKGROUND

1. Technical Field

The present disclosure relates to a transporting robot and a method for controlling the robot, and more particularly, to a robot which loads articles and transports the articles to a destination and a method for controlling the robot.

2. Description of Related Art

A robot may refer to a machine which automatically handles a given task on its own accord, or which operates autonomously. In particular, a robot which recognizes an environment and autonomously determines to execute an operation may be referred to as an intelligent robot, and various services may be provided by using the intelligent robot.

Related Art 1 discloses a delivery robot, and when a mailman transports a delivery article to a predetermined location, the delivery robot may transport the delivery article to a delivery destination such as a building, an apartment, or a shop.

A moving robot disclosed in Related Art 2 cleans in cooperation with peripheral devices while communicating with the peripheral devices through a 5G communication environment and includes an artificial intelligence module to divide a cleaning target zone.

However, Related Art 1 simply discloses a robot which transports articles to a delivery destination and Related Art 2 simply discloses a robot which cleans by using the artificial intelligence module. Related Arts 1 and 2 have limitations in that specific implementations for the traveling of the delivery robot are not specifically disclosed, and specific implementations for a situation generated during the traveling are not clearly disclosed.

Related Art 1: Korean Unexamined Patent Application Publication No. 10-2018-0123298 (published on Nov. 16, 2018)

Related Art 2: Korean Unexamined Patent Application Publication No. 10-2019-0089794 (published on Jul. 31, 2019)

SUMMARY OF THE INVENTION

An objective to be achieved by the present disclosure is to provide a method for estimating center of gravity information of a transporting robot.

Another objective of the present disclosure is to determine a traveling limit condition based on the estimated center of gravity information.

Still another objective of the present disclosure is to provide a transporting robot which effectively travels on an entire route or a partial route, and a control method thereof.

Aspects of the present disclosure are not limited to the above-mentioned aspects, and other technical aspects not mentioned above will be clearly understood by those skilled in the art from the following description.

According to an aspect of the present disclosure, a transporting robot includes: a wheel driver configured to drive one or more wheels to move the transporting robot; a loading box configured to load an article; and a controller configured to estimate center of gravity information of the transporting robot based on reference center of gravity information of the transporting robot and pressure distribution information of an article loaded in the loading box.

The controller may be configured to determine profile information related to acceleration and deceleration for traveling of the transporting robot based on the estimated center of gravity information, and control the wheel driver based on the determined profile information.

According to another aspect of the present disclosure, a control method of a transporting robot includes: estimating center of gravity information of the transporting robot based on previously stored reference center of gravity information and pressure distribution information of an article loaded in a loading box; determining profile information related to acceleration and deceleration for traveling of the transporting robot based on the estimated center of gravity information; and moving based on the determined profile information.

According to various embodiments of the present disclosure, center of gravity information of the transporting robot is estimated so that the transporting robot may travel stably without overturning. Further, an entire route and a partial route of the transporting robot are optimized to be generated and updated so that the traveling efficiency is improved, and the transporting robot may travel safely by avoiding obstacles.

BRIEF DESCRIPTION OF THE DRAWINGS

The above and other aspects, features, and advantages of the present disclosure will become apparent from the detailed description of the following aspects in conjunction with the accompanying drawings, in which:

FIG. 1 is a view illustrating a 5G network based cloud system according to an embodiment of the present disclosure;

FIG. 2 is a view for explaining a transporting robot in which an article is loaded such that center of gravity changes according to an embodiment of the present disclosure;

FIG. 3 is a view for explaining a transporting robot which measures pressure distribution of an article loaded in a loading box according to an embodiment of the present disclosure;

FIG. 4 is a bottom view obtained when a transporting robot is seen from the ground according to an embodiment of the present disclosure;

FIG. 5 is a relative block diagram illustrating a configuration of a control system and a transporting robot according to an embodiment of the present disclosure;

FIGS. 6A and 6B are graphs for comparing acceleration and deceleration information of a transporting robot based on a change in center of gravity information according to an embodiment of the present disclosure;

FIGS. 7 and 8 are views for explaining movement of a transporting robot which linearly travels according to an embodiment of the present disclosure;

FIG. 9 is a view for explaining movement of a transporting robot which travels in a curve according to an embodiment of the present disclosure;

FIG. 10 is a view for explaining a transporting robot which provides an entire route from a departing point to a destination according to an embodiment of the present disclosure;

FIG. 11A and FIG. 11B are views for explaining a driving method of a transporting robot which adjusts a curved route included in the entire route according to an embodiment of the present disclosure;

FIG. 12 is a view for explaining a transporting robot which travels a partial route based on a selected candidate route according to an embodiment of the present disclosure; and FIGS. 13 and 14 are sequential diagrams for explaining a driving method of a transporting robot according to various embodiments of the present disclosure.

DETAILED DESCRIPTION

In the following description, the terms "module" and "unit" for referring to elements are assigned and used exchangeably in consideration of convenience of explanation, and thus, the terms per se do not necessarily have different meanings or functions. Wherever possible, the same reference numbers will be used throughout the drawings to refer to the same or like parts. In the following description, known functions or structures, which may confuse the substance of the present disclosure, are not explained. Further, the accompanying drawings are provided for more understanding of the embodiment disclosed in the present specification, but the technical spirit disclosed in the present invention is not limited by the accompanying drawings. It should be understood that all changes, equivalents, and alternatives included in the spirit and the technical scope of the present invention are included.

Although the terms first, second, third, and the like, may be used herein to describe various elements, components, regions, layers, and/or sections, these elements, components, regions, layers, and/or sections should not be limited by these terms. These terms are generally used only to distinguish one element from another.

Similarly, it will be understood that when an element is referred to as being "connected," "attached," or "coupled" to another element, it can be directly connected, attached, or coupled to the other element, or intervening elements may be present. In contrast, when an element is referred to as being "directly on," "directly engaged to," "directly connected to," or "directly coupled to" another element or layer, there may be no intervening elements or layers present.

Further, relational terms to be described below such as "on/over/up" and "beneath/under/down" may be used to discriminate any one subject or element from another subject or element without necessarily requiring or comprehending a physical or logical relationship or sequence of subjects or elements.

Further, in the drawings, a rectangular coordinate system (x, y, z) may be used. In the drawings and the following description, a direction which is substantially horizontal to the ground is defined as a first direction and in the drawings, the first direction is denoted by the y-axis direction.

As used herein, the singular forms are intended to include the plural forms as well, unless the context clearly indicates otherwise. The terms "comprises," "comprising," "includes," "including," "containing," "has," "having" or other variations thereof are inclusive and therefore specify the presence of stated features, integers, steps, operations, elements, and/or components, but do not preclude the presence or addition of one or more other features, integers, steps, operations, elements, components, and/or groups thereof.

First, since various embodiments of the present disclosure use a technology related to an artificial intelligence, the artificial intelligence will be described in brief below.

Artificial intelligence refers to a field of studying artificial intelligence or a methodology for creating the same. Moreover, machine learning refers to a field of defining various problems dealing in an artificial intelligence field and studying methodologies for solving the same. In addition, machine learning may be defined as an algorithm for improving performance with respect to a task through repeated experience with respect to the task.

An artificial neural network (ANN) is a model used in machine learning, and may refer in general to a model with problem-solving abilities, composed of artificial neurons (nodes) forming a network by a connection of synapses. The ANN may be defined by a connection pattern between neurons on different layers, a learning process for updating model parameters, and an activation function for generating an output value.

The ANN may include an input layer, an output layer, and may selectively include one or more hidden layers. Each layer includes one or more neurons, and the artificial neural network may include synapses that connect the neurons to one another. In an ANN, each neuron may output a function value of an activation function with respect to the input signals inputted through a synapse, weight, and bias.

Model parameters refer to parameters determined through learning, and may include weights of synapse connections, biases of neurons, and the like. Moreover, hyperparameters refer to parameters which are set before learning in a machine learning algorithm, and include a learning rate, a number of iterations, a mini-batch size, an initialization function, and the like.

The objective of training an ANN is to determine model parameters for significantly reducing a loss function. The loss function may be used as an indicator for determining an optimal model parameter in a learning process of an artificial neural network.

The machine learning may be classified into supervised learning, unsupervised learning, and reinforcement learning depending on the learning method.

Supervised learning may refer to a method for training an artificial neural network with training data that has been given a label. In addition, the label may refer to a target answer (or a result value) to be guessed by the artificial neural network when the training data is inputted to the artificial neural network. Unsupervised learning may refer to a method for training an artificial neural network using training data that has not been given a label. Reinforcement learning may refer to a learning method for training an agent defined within an environment to select an action or an action order for maximizing cumulative rewards in each state.

Machine learning of an artificial neural network implemented as a deep neural network (DNN) including a plurality of hidden layers may be referred to as deep learning, and the deep learning is one machine learning technique. Hereinafter, the meaning of machine learning includes deep learning.

FIG. 1 is a view illustrating a 5G network based cloud system 1000 according to an embodiment of the present disclosure.

Referring to FIG. 1, the cloud system 1000 may include a transporting robot 100, a mobile terminal 200, a control system 300, various devices 400, and a 5G network 500.

The transporting robot 100 may have an autonomous driving function as a robot 100 which transports articles from a departing point to a destination and may include a plurality of wheels for movement.

The mobile terminal 200 may communicate with the transporting robot 100 over the 5G network 500 and may be possessed by a person having authority for article receiving in an arrival location. Here, the mobile terminal 200 may be implemented by a portable phone, a smartphone, or a wearable device such as a smartwatch, smart glasses, and a head mounted display (HMD).

The control system 300 may remotely control the transporting robot 100 and respond to various requests from the transporting robot 100. The control system 300 may provide a moving route to the transporting robot 100 and provide a non-congested route to the transporting robot 100 in real time.

Various devices 400 may include, for example, a personal computer (PC) 400a, an autonomous vehicle 400b, or a home robot 400c. The home robot 400c may communicate and interact with the transporting robot 100. For example, when the transporting robot 100 accesses a home within a predetermined range, the home robot 400c may receive articles by communicating with the transporting robot 100.

The various devices 400 may be connected, for example, to the robot 100, the mobile terminal 200, and the control system 300 in a wired or wireless manner over the 5G network 500.

Since the transporting robot 100, the mobile terminal 200, the control system 300, and other various devices 400 are all equipped with a 5G module, they are capable of transmitting and receiving data at speeds of 100 Mbps to 20 Gbps (or higher), transmitting large-capacity video files to various devices, and being driven at low power to thereby minimize power consumption. However, the transmission rate may be implemented differently according to the embodiment.

The 5G network 500 may provide a communication environment of devices in a wired or wireless manner, including a 5G mobile communication network, a local area network, and the Internet.

FIG. 2 is a view for explaining a transporting robot 100 according to an embodiment of the present disclosure in which an article is loaded such that center of gravity changes.

First, a structure and an external appearance of the transporting robot 100 will be described briefly. The transporting robot 100 may include a head and a body. The head may include a display 141 for outputting various information and receiving a user operation (for example, button input or touch input). The body may include a loading box 181 in which articles are loaded and various modules, circuits, and configurations required to drive the transporting robot 100. Further, the body may include a plurality of wheels WH (WHa, WHb, WHc (not illustrated), and WHd) for moving to a destination.

The loading box 181 may have three levels 181a to 181c. The articles may be loaded in the levels 181a to 181c of the loading box 181, and the levels of the loading box may be equipped to move a predetermined distance in the opening and closing thereof with respect to the transporting robot 100. That is, the levels 181a to 181c of the loading box 181 may be opened or closed for loading the articles or withdrawing the loaded articles, and when the levels 181a to 181c are opened or closed, the levels 181a to 181c may move a predetermined distance in a first direction (the y-axis direction).

Each level 181a to 181c of the loading box 181 may be implemented in a sliding manner which is able to move a predetermined distance in the first direction. When the levels 181a to 181c move in a direction to be close to the transporting robot 100, the levels 181a to 181c may close, and when the levels 181a to 181c moves in a direction to be farther from the transporting robot 100, the levels 181a to 181c may open. The levels of the loading box 181 may be implemented to have more or less levels.

In the loading box 181 of a transporting robot 100A (100), no articles are loaded. Center of gravity information COG in this state may be referred to as reference center of gravity information RCOG. The center of gravity information COG may be represented in coordinates in a three-dimensional space. When there are no articles in the loading box 181 at the time of manufacturing or designing of the transporting robot 100A (100), the reference center of gravity information RCOG may be estimated based on structure information and weight information of the transporting robot 100A (100) itself. The estimation may be performed by a simulation device.

According to an embodiment, in a transporting robot 100B (100), a first loading box 181a, which is the uppermost level, may be exposed. The transporting robot 100B (100) may load the articles in the first loading box 181a. As a selective embodiment, the weight of an article may be 30 kilograms. After loading the article, the transporting robot 100B (100) may close the first loading box 181a.

In a state in which the article is already loaded in the first loading box 181a, a transporting robot 100C (100) may measure pressure distribution information of the loading box 181 before starting travel. Specifically, the transporting robot 100C (100) may measure the pressure distribution information of each of the loading boxes 181a to 181c (181) by using a pressure sensor 137 (described below with reference to FIG. 5) disposed in a lower portion of the first to third loading boxes 181a to 181c.

The transporting robot 100C (100) may calculate the center of gravity information COG based on the pressure distribution information. The center of gravity information COG may be information obtained by updating the reference center of gravity information RCOG. The center of gravity information COG may be calculated as a position that is higher or lower than a position where the article is not loaded in the loading box 181.

FIG. 3 is a view for explaining a transporting robot 100 which measures pressure distribution of an article loaded in a loading box according to an embodiment of the present disclosure.

Referring to FIG. 3, the transporting robot 100 loads articles Art1 and Art2 in the first loading box 181a and shows pressure distribution information of the loaded articles Art1 and Art2. For example, the loaded articles may be a first article Art1 shaped like a rugby ball and a second article Art2 shaped like a donut.

The pressure sensor 137 (described below) may measure positions where the first article Art1 and the second article Art2 are disposed on an x-y plane, and a robot controller 190 (described below with reference to FIG. 5) of the transporting robot 100 may acquire the positions as numerical values. Further, the pressure sensor may measure pressure distribution of the first article Art1 and the second article Art2, and the robot controller 190 may acquire the pressure distribution as numerical values.

At this time, the robot controller 190 may receive the measured values from the pressure sensor to acquire the pressure distribution information of all the articles in the first loading box 181a, as represented by a graph. That is, the robot controller 190 may not only simply measure the pressure or weight of the article, but also measure pressure distribution information of each level of the loading box.

FIG. 4 is a bottom view obtained when a transporting robot is seen from the ground according to an embodiment of the present disclosure.

Referring to FIG. 4, the transporting robot 100 may include a plurality of wheels WH. The plurality of wheels WH may include driving wheels WHc and WHd, and auxiliary wheels WHa and WHb. According to the selective embodiment, all of the driving wheels and auxiliary wheels may be implemented as driving wheels, and a separate direction switching wheel may be further included.

The driving wheels WHc and WHd may be disposed in a position where the transporting robot 100 and the ground are in contact with each other, and allow the transporting robot 100 to travel. A wheel driver 170 (see FIG. 5) may control the driving wheels WHc and WHd for allowing the transporting robot 100 to travel. The wheel driver 170 may control the rotation speed of the driving wheels WHc and WHd for controlling an operation required for the traveling of the robot, such as turning, going straight, or switching the traveling direction.

The auxiliary wheels WHa and WHb may be equipped as a 360 degree rotatable caster on the x-y plane, which is substantially parallel to the ground, but the embodiment is not limited thereto. Further, the number of the driving wheels WHc and WHd and the auxiliary wheels WHa and WHb as described above and purposes thereof may vary depending on an implemented example.

FIG. 5 is a relative block diagram illustrating a configuration of a control system 300 and a transporting robot 100 according to an embodiment of the present disclosure.

First, the control system 300 is a system which is capable of controlling the transporting robot 100 and may include a system communicator 310, a system memory 320, and a system controller 330.

When the transporting robot 100 passively moves in accordance with the control of the control system 300, the control system 300 may generate a route for the transporting robot 100 and provide a route guidance service to the transporting robot 100 until a destination while monitoring movement of the transporting robot 100. Further, the control system 300 may store a deep neural network model in the system memory 320 to set center of gravity information of the transporting robot 100 and a traveling limit condition based on the center of gravity information.

Hereinafter, independent driving of the transporting robot 100 will be mainly described.

The transporting robot 100 may include a robot communicator 110, an input interface 120, a sensor 130, an output interface 140, a robot memory 150, a power supply 160, the wheel driver 170, a loading box opening/closing unit 180, and the robot controller 190. Components illustrated in FIG. 5 are not essential for implementing the transporting robot 100, thus the transporting robot 100 described in this specification may include fewer or more components than the above described components.

The robot communicator 110 may include, for example, a wired/wireless communication module to communicate with the control system 100, the mobile terminal 200 (see FIG. 1). As an alternative embodiment, the robot communicator 110 may use communication technology such as global system for mobile communication (GSM), code division multiple access (CDMA), long term evolution (LTE), 5G, wireless LAN (WLAN), wireless-fidelity (Wi-Fi), Bluetooth™, radio frequency identification (RFID), Infrared Data Association (IrDA), ZigBee, and near field communication (NFC).

The input interface 120 may include a user input interface which receives information from a user. As a selective embodiment, the input interface 120 may include a camera 121 configured to input an image signal and a microphone 123 configured to receive an audio signal. In this case, the signal obtained from the camera 121 or the microphone 123 may be referred to as sensing data or sensor information, by considering the camera 121 or the microphone 123 as a sensor. The camera 121 may include a vision recognizing function to determine a type of an article to be loaded in the loading box 181. The input interface 120 may further include a module capable of being tagged.

The input interface 120 may obtain input data to be used when acquiring an output by using training data and a learning model for model training. The input interface 120 may obtain raw input data, and in this case, the robot controller 190 may extract input features as a preprocessing operation on the input data.

The sensor 130 may obtain at least one of internal information of the transporting robot 100, surrounding environment information of the transporting robot 100, or user information by using various sensors.

In this case, the sensor 130 may include, for example, a position receiving sensor based on a satellite, a distance detecting sensor, an illumination sensor, an obstacle detecting sensor 131, an acceleration sensor 133, a magnetic sensor, a gyro sensor (gyroscope sensor) 135, the pressure sensor 137, an inertia sensor, an RGB sensor, an infrared (IR) sensor, a finger scan sensor, an ultrasonic sensor, an optical sensor, a microphone, a light detection and ranging (LiDAR) sensor, a barometer sensor, or a radar.

Here, the obstacle detecting sensor 131 may detect an obstacle which approaches the transporting robot 100 and includes an infrared ray based or light based sensor.

The acceleration sensor 133 may detect movement of the transporting robot 100 and may be implemented through three or more axes. The gyro sensor 135 may detect rotation of the transporting robot 100. The acceleration sensor 133 and the gyro sensor 135 may detect the movement and the rotation of the transporting robot 100 and may be integrated as an inertial measurement unit (IMU) sensor.

The pressure sensor 137 may measure pressure distribution information of the article disposed in the loading box 181. The pressure sensor 137 not only measures pressure of the article disposed in the loading box 181, but also measures distribution information of pressure which is downwardly applied to the loading box 181.

The output interface 140 may generate a visual, auditory, or tactile related output and may include an optical output interface and the display 141 (a plurality of displays can be implemented) for outputting visual information, a speaker 143 for outputting auditory information, and a haptic module for outputting tactile information.

The robot memory 150 may store a plurality of application programs (or applications) to be driven by the transporting robot 100, data needed to operate the transporting robot 100, and commands for the transporting robot 100.

The robot memory 150 may store information necessary to perform an operation by using artificial intelligence, machine learning, and an artificial neural network. The robot memory 150 may store a deep neural network model. The deep neural network model may be used to infer a result value with respect to new input data rather than learning data, and the inferred value may be used as a basis for a determination to perform an operation.

The power supply 160 is supplied with external power and internal power to supply the power to each component of the transporting robot 100, under the control of the robot controller 190. The power supply 160 may include a battery, and the battery may be an embedded battery or a replaceable battery. The battery may be implemented as an embedded battery or a replaceable battery, and may be charged by using a wired or wireless charging method. Here, the wireless charging method may include a magnetic induction method or a magnetic resonance method.

The wheel driver 170 may control the plurality of wheels to move the transporting robot 100. The wheel driver 170 may be driven by the robot controller 190.

The loading box opening/closing unit 180 may open the levels 181a to 181c of the loading box 181 to load the article, and when the article is loaded, close the levels 181a to 181c of the loading box 181. According to a selective embodiment, the levels 181a to 181c may be implemented as separate independent loading boxes.

The robot controller 190 is a module that controls the components of the transporting robot 100. Here, the robot controller 190 may denote, for example, a hardware-embedded data processing device having a physically structured circuit to execute functions expressed as instructions or codes included in a program. As examples of the data processing device embedded in hardware, a microprocessor, a central processor (CPU), a processor core, a multiprocessor, an application-specific integrated circuit (ASIC), and a field programmable gate array (FPGA) may be included, but the scope of the present disclosure is not limited thereto.

Hereinafter, the operation of the robot controller 190 will be mainly described.

First, the robot controller 190 may estimate reference center of gravity information RCOG corresponding to a case where no article in the loading box 181 of the transporting robot 100 is present. Information related to the position of the center of gravity information COG of the transporting robot may be represented by a coordinate (x, y, z) with a numerical value, and an origin (0, 0, 0) of the coordinate may be appropriately set by a specific point of the transporting robot 100.

The robot controller 190 may estimate the reference center of gravity information RCOG based on at least one of structure information of the transporting robot 100, position information, or weight information of components of the transporting robot 100.

To this end, the robot controller 190 may run a center-of-gravity simulation program and estimate the reference center of gravity information RCOG based on an artificial intelligence based learning model. A method of estimating center of gravity information COG using a deep neural network learning model by the robot controller 190 will be described below.

The deep neural network learning model may be stored in the robot memory 150 and receive the position information and weight information of components of the transporting robot 100, the structure information (height information, width information, structures of the head and the body, structure information of the loading box opening/closing unit 180) of the transporting robot 100 as input data.

The deep neural network learning model may output the center of gravity information COG as output data in accordance with input data. To this end, the deep neural network learning model may actually measure information of actual center of gravity information of the transporting robot 100 and compare the measured center of gravity information and estimated center of gravity information. When it is difficult to actually measure the center of gravity information, the deep neural network learning model may acquire a label through the simulation program.

After estimating the reference center of gravity information RCOG, the robot controller 190 may estimate center of gravity information COG when the article is loaded in the loading box 181. Specifically, the robot controller 190 may measure pressure distribution of the article in each of the loading boxes 181a to 181c and estimate the center of gravity information COG of the transporting robot 100 based on the measured pressure distribution information and the estimated reference center of gravity information.

The robot controller 190 may use a deep neural network model having: at least one of level information about where the article is located, pressure distribution information of the loaded article measured by the pressure sensor 137, or the reference center of gravity information RCOG as input data; and selection suitability information of the center of gravity information COG or a numerical value of the center of gravity information as output data.

The following relationship is established between a position coordinate, COG (x, y, z), corresponding to center of gravity COG of a robot, which is an output value deduced by supervised learning and a function, f, deduced by the artificial neural network.

$$COG(x,y,z)=f(l,p_{dist},n)$$

Here, l denotes the level number of the loading box 181 where the article is loaded, $p_{dist}$ denotes weight distribution of the article loaded in the loading box 181, and n denotes the number of levels in the loading box 181. However, the input values are not limited thereto and various variables may be used as input values. A lookup table may be used for weight distribution of the article.

n may be a constant value which does not vary for the same robot. Therefore, n may be replaced with a parameter function Φ which varies in different robots. That is, the parameter function Φ may be represented by a function g with respect to n.

$$\Phi=g(n)$$

It may also be possible to deduce the function g through supervised learning.

Therefore, the position coordinate corresponding to the center of gravity COG of the robot may be expressed as follows.

$$COG(x,y,z)=h(l,p_{dist},\Phi)$$

Here, the relationship of f(l, $p_{dist}$, n)=h(l, $p_{dist}$, Φ) may be established. Further, when necessary, an interpolation method may be applied.

The center of gravity COG data deduced through supervised learning may possess the above-described function for the input value and the output value. Therefore, a position coordinate corresponding to the center of gravity COG of the robot, which is an output value, may be found from the center of gravity COG data with respect to any input value.

Labeling data may be deduced by using, for example, a program which finds center of gravity COG from the shape of an object. That is, when the shape of the object is input, the program may output center of gravity COG of the object.

According to an embodiment, when an article having a spillable content or a breakable article is included in the loading box, the robot controller 190 may adjust the estimated center of gravity information of the transporting robot 100 to within a predetermined range. Further, the robot controller 190 may apply the article type to the calculation of the center of gravity information COG.

Further, the robot controller 190 may determine profile information related to acceleration or deceleration for driving the transporting robot 100 based on the estimated center of gravity information COG, which will be described with reference to FIGS. 6A and 6B.

FIGS. 6A and 6B are graphs for comparing acceleration and deceleration information of a transporting robot 100 based on a change in center of gravity information COG according to an embodiment of the present disclosure.

Referring to FIG. 6A, the transporting robot 100 may repeat driving of accelerating to increase speed and decelerating to reduce speed and stop. When no article in the loading box 181 is present, the transporting robot 100 may set an acceleration/deceleration profile for traveling based on reference center of gravity information RCOG.

Specifically, the robot controller 190 increases the speed of the transporting robot 100 to an acceleration speed a_u1 during an acceleration section. When the robot controller 190 reaches a maximum speed Vmax, the robot controller 190 may drive the transporting robot 100 at a constant speed which is the maximum speed Vmax. When the constant speed section passes, the robot controller 190 may reduce the speed of the transporting robot 100 to a_d1 during a deceleration section.

FIG. 6B illustrates an example of the article being loaded in the loading box 181 so that the value of the z-axis corresponding to the center of gravity is increased, as compared with FIG. 6A.

The robot controller 190 may set an acceleration speed a_u2, which is slower than the acceleration speed a_u1, during the acceleration section, to drive the transporting robot. When the constant speed section passes, the robot controller 190 may reduce the speed of the transporting robot 100 to a_d2 during the deceleration section. Here, a_d2 is set to be larger than a_d1 so that speed is reduced by a gentler slope than that of a_d1.

Accordingly, the robot controller 190 may set profile information for adjusting the speed of the transporting robot 100 depending on the position of the center of gravity information COG, and thus the transporting robot 100 may travel more stably.

In FIGS. 6A and 6B, even though the maximum speed Vmax may be set differently, in some implemented examples, the maximum speed Vmax may be set to be the same. When an article is disposed in the loading box 181, the maximum speed may be set higher (for example, when a heavier article, which can be safely delivered, is disposed in the lower portion of the loading box 181).

The robot controller 190 may control the wheel driver 170 based on the determined profile information.

FIGS. 7 and 8 are views for explaining a traveling condition of a transporting robot which linearly moves according to an embodiment of the present disclosure.

Referring to FIG. 7, the transporting robot 100 may linearly travel in the y-axis direction (−). FIG. 7 is a view for explaining a situation in which the transporting robot 100 accelerates in a traveling direction. Although the origin of the transporting robot 100 may be a specific point of the transporting robot 100, an external specific point of the transporting robot 100 may also be set as the origin. Hereinafter, center of gravity information COG and center of gravity COG will be interchangeably used.

The weight of the transporting robot 100 is gravity Fg. Gravity Fg acts perpendicular on the ground at the center of gravity COG. A reaction force Fs is generated at a contact point GC1 where the auxiliary wheel WHb of the robot makes contact with the ground. In this case, a straight line connecting the contact point GC1 and the center of gravity COG is referred to as a moment arm.

A magnitude M1 of a moment (a torque) due to gravity Fg with respect to the contact point GC1 is a product of the length of a moment arm LM1 and a component force Fgv of gravity which acts vertically on the moment arm.

$$M1 = LM1 \times Fgv$$

Further, an inertial force F for accelerating the transporting robot 100 in the y-axis direction is generated. A magnitude M2 of a moment (a torque) due the inertial force F is a product of the length of the moment arm LM1 and a component force Fv of the inertial force F which acts vertically on the moment arm.

$$M2 = LM1 \times Fv$$

When M2 is smaller than M1 at the time of acceleration, the transporting robot 100 may be driven without overturning. That is, among torques in different directions, torque due to gravity may be set to be larger to prevent overturning of the transporting robot 100.

The robot controller 190 may set the estimated center of gravity information COG as a reference point and determine a traveling limit condition of the transporting robot to prevent the overturning of the transporting robot 100 based on the reference point. When M2 is smaller than M1, the robot controller 190 may determine M2 to be the traveling limit condition.

When a ground reaction force is generated at a plurality of points, the robot controller 190 may set traveling limit conditions by synthesizing forces generated at each of the plurality of points.

Referring to FIG. 8, the transporting robot 100 may linearly travel in the y-axis direction (−). FIG. 8 is a view for explaining a situation in which the transporting robot 100 decelerates in a traveling direction.

The weight of the transporting robot 100 is gravity Fg. Gravity Fg acts perpendicular on the ground at the center of gravity COG. The reaction force Fs is generated at a contact point GC2 where the auxiliary wheel WHa of the robot makes contact with the ground. In this case, a straight line connecting the contact point GC2 and the center of gravity COG is a moment arm.

A magnitude M3 of a moment (a torque) due to gravity Fg with respect to the contact point GC2 is a product of the length of a moment arm LM2 and the component force Fgv of gravity which acts vertically on the moment arm.

$$M3 = LM2 \times Fgv$$

Further, the inertial force F for accelerating the transporting robot 100 in the y-axis direction (+) is generated. A magnitude M4 of a moment (a torque) due to the inertial force F is a product of the length of the moment arm LM2 and the component force Fv of the inertial force F which acts vertically on the moment arm.

$$M4 = LM2 \times Fv$$

When M4, due to gravity at the time of deceleration, is smaller than M3, due to the inertial force, for the robot controller 190, the transporting robot 100 may travel without overturning.

The robot controller 190 may set the estimated center of gravity information COG as the reference point and determine the traveling limit condition of the transporting robot to prevent the overturning of the transporting robot 100 based on the reference point. When M4 is smaller than M3, the robot controller 190 may determine M4 as the traveling limit condition.

When a ground reaction force is generated at a plurality of points, the robot controller 190 may set traveling limit conditions by synthesizing forces generated at each of the plurality of points.

FIG. 9 is a view for explaining a traveling condition of a transporting robot 100 which moves in a curve according to an embodiment of the present disclosure.

Referring to FIG. 9, when the transporting robot 100 moves in a predetermined traveling direction, centrifugal force and centripetal force of the opposite direction may be generated. When centrifugal force in accordance with the transporting robot 100 traveling in a curve is set as the inertial force F, a straight line connecting a contact point GC3 where the wheel WHb makes contact with the ground and the center of gravity COG is a moment arm. By adjusting a rotation radius of the centrifugal force (a curvature is an inverse of the rotation radius), the inertial force may be adjusted so that the stability of the transporting robot 100 may be improved.

A magnitude M5 of a moment (a torque) due to gravity Fg with respect to the contact point GC3 is a product of the length of a moment arm LM3 and the component force Fgv of gravity which acts vertically on the moment arm. A magnitude M6 of a moment (a torque) due to the inertial force F with respect to the contact point GC3 is a product of the length of the moment arm LM3 and the component force Fv of gravity which acts vertically on the moment arm.

The robot controller 190 may set M6, due to the inertial force F, to be smaller than M5, due to gravity. In this case, the transporting robot 100 may not overturn while traveling in a curve.

When a ground reaction force is generated at a plurality of points or another external force acts, the robot controller 190 may set traveling limit conditions by synthesizing forces generated at each of the plurality of points.

The robot controller 190 may accelerate/decelerate in accordance with the traveling in a curve while the transporting robot 100 accelerates/decelerates in the traveling direction.

The robot controller 190 may determine whether the transporting robot 100 travels linearly or in a curve, by the acceleration sensor 133 and the gyro sensor 135. The robot controller 190 may determine a point of the transporting robot 100 where the ground reaction force is generated based on direction and magnitude of the force applied to the transporting robot 100.

FIG. 10 is a view for explaining a transporting robot 100 which provides an entire route from a departing point to a destination according to an embodiment of the present disclosure.

The transporting robot 100 may set a destination and move from a departing point to the destination. When there is a plurality of stops, the transporting robot 100 sequentially visits the stops to deliver the articles. As a selective embodiment, the control system 300 may explore the entire route in which the transporting robot 100 is to move to provide the entire route to the transporting robot 100.

The robot controller 190 may generate the entire route from the departing point to the destination based on a plurality of nodes and an edge connecting the nodes. That is, the robot controller 190 may generate the entire route to the destination as a graph.

FIG. 11A and FIG. 11B are views for explaining a driving method of a transporting robot 100 which updates an entire route according to an embodiment of the present disclosure.

The robot controller 190 may determine whether an angle formed by adjacent edges with respect to a predetermined node is within a range of an angle to be adjusted at one point of the entire route. That is, when the transporting robot 100 travels on a curved route, rather than traveling linearly, the robot controller 190 may update a rotating angle of the corresponding point.

The robot controller 190 may update the route of the corresponding point such that the rotation radius becomes larger (the curvature is reduced). When there is a collision risk for the transporting robot 100 due to a static obstacle (for example, a wall or a column), the robot controller 190 may update the range to within a range that does not collide.

For example, when an angle Ang formed by the edges with respect to a specific node N2 exceeds a predetermined range, the robot controller 190 may generate a new edge connecting center points of the adjacent edges. When the generated edge does not collide with a surrounding static obstacle Wa1, the entire route at the corresponding point may be updated.

FIG. 12 is a view for explaining a transporting robot 100 which travels a partial route based on a candidate route according to an embodiment of the present disclosure.

Referring to FIG. 12, the transporting robot 100 moves based on the generated entire route, and when the transporting robot 100 moves on a partial route included in the entire route, the transporting robot 100 may update the route in real time.

The robot controller 190 may avoid the obstacle by means of the camera 121 and the obstacle detecting sensor 131.

The robot controller 190 may divide the entire route into at least one partial route. When the transporting robot travels on the partial route, the robot controller 119 may update the partial route to avoid a dynamic obstacle Obst which may collide with the transporting robot 100 based on the image information obtained by photographing the partial route with the camera 121 or obstacle detecting information obtained by the obstacle detecting sensor 131.

The robot controller 190 may select one or more candidate movable routes CR1 to CR9 when the transporting robot travels on the partial route and select a predetermined candidate route based on at least one of collision possibility information in accordance with the position of an obstacle, information about time required to travel on the candidate route, or distance information of the candidate route, among the selected candidate routes, and may control the wheel driver 170 to travel the selected candidate route. The robot controller 190 may calculate a linear velocity and an angular velocity by applying a rotation radius.

The robot controller 190 may select a route to avoid in consideration of the speed of the moving dynamic obstacle Obst.

Further, the robot controller 190 may primarily adjust the rotation radius of the transporting robot 100 to avoid the dynamic obstacle Obst, and even though the rotation radius is adjusted, when there is a collision possibility with the dynamic obstacle Obst, the robot controller may secondarily reduce the traveling speed of the transporting robot 100.

Further, every time a predetermined article located in the loading box is delivered to a delivery destination, the robot controller 190 may update the estimated center of gravity information. The robot controller 190 may determine profile information based on the updated center of gravity information. Further, the robot controller 190 may control the wheel driver 170 based on the determined profile information.

FIGS. 13 and 14 are sequential diagrams for explaining a driving method of a transporting robot 100 according to various embodiments of the present disclosure.

Referring to FIG. 13, the transporting robot 100 acquires pressure distribution information of a loaded article in step S710.

The transporting robot 100 determines characteristic information of the loaded article in step S720.

The transporting robot 100 identifies whether the loaded article is a breakable article or includes a spillable content and reflects the identified information on the traveling. For example, when the loaded article is difficult to handle or has an expiration date, the transporting robot 100 may change the order of delivery, change center of gravity information, or adjust traveling speed.

The transporting robot 100 generates speed profile information related to acceleration/deceleration in step S730.

Next, the transporting robot 100 sets an entire route and adjusts a rotation radius at the time of traveling in a curve in step S740.

When there is no risk of overturning in step S760, during traveling (step S750), the transporting robot 100 continuously travels, and when there is a risk of overturning in step S760, the transporting robot 100 may generate the speed profile again in step S730.

Referring to FIG. 14, the transporting robot 100 estimates center of gravity information COG of the transporting robot based on previously stored reference center of gravity information RCOG and pressure distribution information of an article loaded in the loading box (S810).

The transporting robot 100 determines profile information on the acceleration and deceleration for traveling based on the estimated center of gravity information COG (S820).

The transporting robot 100 moves based on the determined profile information (S830).

The transporting robot 100 may set the estimated center of gravity information as a reference point and determine a traveling limit condition of the transporting robot based on the reference point so that the transporting robot does not overturn.

Specifically, the transporting robot 100 may set a moment arm connecting the reference point and a reaction force point where a ground reaction force is generated, among points where the wheel makes contact with the ground, and, during the driving of the transporting robot 100, determine the traveling limit condition such that a first torque, which acts vertically on the moment arm due to inertial force of the reference point, is smaller than a second torque, which acts vertically on the moment arm due to gravity of the reference point.

Additionally, when the transporting robot 100 travels in a curve, the traveling limit condition may be determined such that a first torque which acts vertically on the moment arm due to the centrifugal force of the reference point is smaller than a second torque which acts vertically on the moment arm due to the gravity of the reference point.

Further, the transporting robot 100 may generate an entire route from a departing point to a destination based on a plurality of nodes and an edge connecting the nodes, and when an angle formed by adjacent edges with respect to a predetermined node at one point of the entire route is within an angle range to be adjusted, and may update the route at one point such that the rotation radius of the transporting robot is increased to within a predetermined range.

The transporting robot 100 may divide the entire route into at least one partial route, and when the transporting robot travels on a partial route, may update the partial route so as to avoid a dynamic obstacle which may collide with the transporting robot based on image information obtained by photographing the partial route or obstacle detecting information.

Further, every time a predetermined article located in the loading box is delivered to a delivery destination, the transporting robot 100 may update the center of gravity information, determine profile information about acceleration and deceleration for the traveling of the transporting robot 100 based on the updated center of gravity information, and move based on the determined profile information.

The present disclosure described above can be embodied as computer-readable codes on a medium on which a program is recorded. The computer readable medium includes all types of recording devices in which data readable by a computer system readable can be stored. The computer readable medium may be, for example, a hard disk drive (HDD), a solid state disk (SSD), a silicon disk drive (SDD), read only memory (ROM), random access memory (RAM), CD-ROM, a magnetic tape, a floppy disk, or an optical data storage device. In addition, the computer may include the processor 190 of the mobile robot 100.

In the foregoing, while specific embodiments of the present disclosure have been described for illustrative purposes, the scope or spirit of the present disclosure is not limited thereto, it will be understood by those skilled in the art that various changes and modifications can be made to other specific embodiments without departing from the spirit and scope of the present disclosure. Therefore, the scope of the present disclosure should be defined not by the above-described embodiments but by the technical idea defined in the following claims.

What is claimed is:

1. A transporting robot, comprising:
   a wheel driver configured to drive one or more wheels to move the transporting robot;
   a loading box configured to load an article; and
   a controller configured to estimate center of gravity information of the transporting robot based on reference center of gravity information of the transporting robot and pressure distribution information of an article loaded in the loading box,
   wherein the controller is configured to:
      determine profile information related to acceleration and deceleration for traveling of the transporting robot based on the estimated center of gravity information; and
      control the wheel driver based on the determined profile information, wherein the controller is configured to:
      set the estimated center of gravity information as a reference point, and
      determine a traveling limit condition for the transporting robot based on the reference point so that the transporting robot does not overturn,
   wherein the controller is configured to:
      set a moment arm connecting the reference point and a reaction force point where a ground reaction force is generated, among points where the wheel makes contact with the ground, and
      during the traveling of the transporting robot, determine the traveling limit condition such that a first torque, which acts vertically on the moment arm due to inertial force of the reference point, is smaller than a second torque, which acts vertically on the moment arm due to gravity of the reference point.

2. The transporting robot according to claim 1, wherein the loading box includes a plurality of levels, and each level includes a pressure sensor which measures pressure distribution of the article loaded in the loading box, and the controller is configured to estimate the center of gravity information of the transporting robot based on at least one of level information about where the article is located, pressure distribution information of the loaded article acquired by the pressure sensor, or the reference center of gravity information.

3. The transporting robot according to claim 1, wherein when the transporting robot travels on a curved route, the controller is configured to determine the traveling limit condition such that the first torque, which acts vertically on the moment arm due to centrifugal force of the reference point, is smaller than the second torque, which acts vertically on the moment arm due to gravity of the reference point.

4. The transporting robot according to claim 1, wherein the controller is configured to:
generate an entire route, from a departing point to a destination, based on a plurality of nodes and an edge connecting the nodes, and
when an angle formed by adjacent edges with respect to a predetermined node at one point of the entire route is within a range of an angle to be adjusted, update the route of the one point so that a rotation radius of the transporting robot is increased to within a predetermined range, at the one point.

5. The transporting robot according to claim 4, further comprising:
a camera; and
an obstacle detecting sensor,
wherein the controller is configured to:
divide the entire route into at least one partial route; and
when the transporting robot travels on the partial route, update the partial route so as to avoid a collision with a dynamic obstacle, based on image information, obtained by photographing the partial route with the camera, and obstacle detecting information, obtained by the obstacle detecting sensor.

6. The transporting robot according to claim 5, wherein the controller primarily adjusts the rotation radius of the transporting robot to avoid the dynamic obstacle, and even though the rotation radius is adjusted, when there is a collision possibility with the dynamic obstacle, secondarily reduces a traveling speed of the transporting robot.

7. The transporting robot according to claim 5, wherein the controller is configured to:
select one or more candidate moving routes when the robot travels on the partial route;
select a predetermined candidate route based on at least one of collision possibility information in accordance with the position of an obstacle, information about time required to travel on the candidate route, or distance information of the candidate route, among the selected candidate routes; and
control the wheel driver to travel along the selected candidate route.

8. The transporting robot according to claim 2, wherein when an article having a spillable content or a breakable article is included in the loading box, the controller is configured to adjust the estimated center of gravity information of the transporting robot to within a predetermined range.

9. The transporting robot according to claim 2, wherein the controller is configured to use a deep neural network model with at least one of level information about where the article is located, pressure distribution information of the loaded article measured by the pressure sensor, or the reference center of gravity information as input data, and the center of gravity information of the transporting robot as output data.

10. The transporting robot according to claim 1, further comprising:
an acceleration sensor; and
a gyro sensor,
wherein the controller is configured to detect whether the transporting robot travels on a curved route or a straight route by using the acceleration sensor and the gyro sensor.

11. The transporting robot according to claim 1, wherein every time a predetermined article located in the loading box is delivered to a delivery destination, the controller is configured to:
update the estimated center of gravity information;
determine the profile information based on the updated center of gravity information; and
control the wheel driver based on the determined profile information.

12. A control method of a transporting robot, the control method comprising:
estimating center of gravity information of the transporting robot based on previously stored reference center of gravity information and pressure distribution information of an article loaded in a loading box;
determining profile information related to acceleration and deceleration for traveling of the transporting robot based on the estimated center of gravity information; and
moving based on the determined profile information,
the control method further comprising:
setting the estimated center of gravity information as a reference point; and
determining a traveling limit condition of the transporting robot based on the reference point so that the transporting robot does not overturn,
wherein the determining of the traveling limit condition includes:
setting a moment arm connecting the reference point and a reaction force point where a ground reaction force is generated, among points where the wheel makes contact with the ground; and
during the traveling of the transporting robot, determining the traveling limit condition such that a first torque, which acts vertically on the moment arm due to inertial force of the reference point, is smaller than a second torque, which acts vertically on the moment arm due to gravity of the reference point.

13. The control method according to claim 12, wherein the determining of the traveling limit condition includes:
when the transporting robot travels on a curved route, determining the traveling limit condition such that the first torque, which acts vertically on the moment arm due to centrifugal force of the reference point, is smaller than a second torque, which acts vertically on the moment arm due to gravity of the reference point.

14. The control method according to claim 12, further comprising:

generating an entire route from a departing point to a destination, based on a plurality of nodes and an edge connecting the nodes; and updating the route of one point so that a rotation radius of the transporting robot is increased to within a predetermined range at the one point when an angle formed by adjacent edges with respect to a predetermined node at the one point of the entire route is within a range of an angle to be adjusted.

15. The control method according to claim 14, further comprising:

dividing the entire route into at least one partial route; and when the transporting robot travels on the partial route, updating the partial route so as to avoid a collision with a dynamic obstacle, based on image information obtained by photographing the partial route or obstacle detecting information.

16. The control method according to claim 12, further comprising:

updating the center of gravity information every time a predetermined article located in the loading box is delivered to a delivery destination; and determining profile information related to acceleration and deceleration for the traveling of the transporting robot based on the updated center of gravity information and moving the transporting robot based on the determined profile information.

* * * * *